United States Patent [19]

Lakshmanan

[11] 3,923,722

[45] Dec. 2, 1975

[54] ADHESIVE COMPOSITION

[75] Inventor: Pallavoor R. Lakshmanan, Allison Park, Pa.

[73] Assignee: Gulf Research & Development Company, Pittsburgh, Pa.

[22] Filed: Mar. 29, 1974

[21] Appl. No.: 456,165

[52] U.S. Cl..... 260/32.8 A; 260/33.6 A; 260/42.47; 260/829; 260/880 B
[51] Int. Cl.[2].... C08K 5/07; C08K 5/01; C08K 3/26
[58] Field of Search....... 260/42.47, 32.8 A, 33.6 A, 260/829, 880 B

[56] References Cited
UNITED STATES PATENTS

| | | | |
|---|---|---|---|
| 3,538,031 | 11/1970 | Rice | 260/880 B |
| 3,658,740 | 4/1972 | Marrs | 260/880 B |

OTHER PUBLICATIONS

Rubber World–Matls. & Compounding Ingredients for Rubber (Bill Publications) (N.Y.), (1968), pp. 273, 284, 294.

Cagle–Handbook of Adhesive Bonding (McGraw–Hill) (N.Y.), pp. 16-3 & 16-10.

*Primary Examiner*—Donald E. Czaja
*Assistant Examiner*—H. H. Fletcher

[57] ABSTRACT

An adhesive composition consisting essentially of a styrene-butadiene block copolymer, a tackifier, calcium carbonate and a hydrocarbon solvent.

7 Claims, No Drawings

ADHESIVE COMPOSITION

This invention relates to an adhesive composition possessing an extremely high compressive shear strength and an extrusion rate that facilitates the application of the adhesive composition to a substrate. The composition of this invention is one consisting essentially of a styrene-butadiene block copolymer, a tackifier, calcium carbonate and a hydrocarbon solvent or mixtures of hydrocarbon solvents.

The styrene-butadiene block copolymer present in the adhesive composition of the present invention has the following general configuration:

A — B — A, wherein each terminal A is a styrene polymer block with a glass transition temperature above about room temperature (26° C.) and which is relatively incompatible with the elastomeric segment B, defined hereinafter, with the average molecular weight of each A being from about 5,000 to about 125,000, preferably from about 15,000 to about 100,000. B is a butadiene polymer with a glass transition temperature below about room temperature (26° C.), with the average molecular weight of B being from about 15,000 to about 250,000, preferably from about 25,000 to about 150,000. The difference in glass transition temperature between an end block A and a center block B is preferably greater than about 100° C. In the block copolymer used herein the total of the terminal blocks A will amount to about 20 to about 80 weight per cent, preferably from about 23 to about 50 weight per cent, based on the total weight of the block copolymer.

The tackifier used herein can be any of the resinous substances known in the art for enhancing the tack of adhesive compositions, for example, aromatic hydrocarbon resins, at least one of whose components can be derived from petroleum or coal tar distillates. Particularly suitable are those selected from the group consisting of resins based on coumarone or indene, such as coumarone-indene resins, styrene-indene-isoprene terpolymers, etc. In general, the softening point of the tackifier will be between about 38° to about 160° C., preferably between about 70° and 150° C.

The third component is calcium carbonate having an average particle diameter of about $0.2 \times 10^4$ to about $50 \times 10^4$ A., preferably of about $2 \times 10^4$ to about $25 \times 10^4$ A.

The last component required herein is a hydrocarbon solvent boiling between about 60° to about 145° C., preferably between about 100° to about 120° C., at atmospheric pressure. Those boiling below the defined range will be released too rapidly from the adhesive composition and premature hardening of the remaining components can occur, while those boiling above the defined range can result in sagging or flow of the adhesive in use. Solvents which can be used are aromatics having from six to eight carbon atoms, such as toluene, the xylenes, etc.; aliphatics having from six to eight carbon atoms, such as normal hexane, normal octane, etc.; ketones having from two to four carbon atoms, such as methyl ethyl ketone, etc.; etc.

The adhesive composition of this invention can be prepared in any conventional manner. For example, the ingredients can be added to the solvent in any order, after which mixing can take place until a substantially homogeneous mixture is obtained. Such mixing can be carried out at room temperature and room pressure over a period of about three to about four hours.

The adhesive composition herein will consist essentially of the following components within the following ranges, assuming the presence of 100 parts by weight of the styrene-butadiene component in the final composition.

| Component | Weight Per Cent Broad Range | Preferred |
|---|---|---|
| Tackifier | 20–125 | 35–100 |
| Calcium Carbonate | 60–500 | 75–400 |
| Solvent | 85–1500 | 100–600 |

If desired, a thixotropic agent, such as fumed silica, in an amount of about 0.5 to about five weight per cent, preferably about one to about two weight per cent, based on the weight of the final composition and an antioxidant, such as 1,3,5-trimethyl-2,4,6(3,5-ditertiarybutyl-4-hydroxylbenzyl)benzene, in an amount of about 0.1 to about five weight per cent, preferably about 0.25 to about 1.5 weight per cent, based on the weight of the final composition, can also be incorporated in the adhesive composition of this invention. The thixotropic agent can be used to control sag flow of the composition and the antioxidant to provide resistance toward oxidation.

The new composition of this invention is particularly useful in bonding wood to wood in the construction of housing, for example, in the laying of plywood subflooring, wall paneling, etc. It can also be used in bonding wood, hard board, gypsum board and plastics to wood, concrete and metals.

The improved adhesive composition of this invention can be further understood by reference to the following. Compositions were prepared wherein a styrene-butadiene block copolymer, a tackifier, calcium carbonate having an average particle diameter of about $2.5 \times 10^4$ to about $5 \times 10^4$ A., and in one case fumed silica (Cab-O-Sil M5), were added to toluene. These ingredients were then mixed for about four hours at atmospheric pressure and atmospheric temperature until a homogeneous composition was obtained. The compositions were then tested for their compressive shear strength in bonding dry plywood to dry lumber. Each piece of lumber and plywood was preconditioned by maintaining the same for 48 hours at 70° ± 5° and a relative humidity of 50 ± 10 per cent. After bonding the plywood to the lumber with the compositions, the assembly was postconditioned by maintaining the same at a temperature of 70°± 5° F. and a relative humidity of 50 ± 10 per cent for 14 days. The assemblies were then tested for their compressive shear strengths in accordance with the procedures outlined in Performance Specifications AFC-01 prepared by American Plywood Association, Tacoma, Washington, May 1971. A compressive shear strength of at least 225 pounds is considered satisfactory for this purpose. The compressive shear strength is an indication of the shear force under compression that can be applied to the adhesive bond to cause rupture at the adhesivesubstrate interface. The extrusion rates of the compositions were also determined. This was done by loading a six-ounce polyethylene cartridge (Model 250-C6, Semco) equipped with a 2½-inch tip (Model 254, Semco) having a ⅛-inch diameter orifice. The cartridge was then loaded into a Semco Sealant Gun (Model 250–6, Semco) with an air line for air pressure dispensation of the material. The material was dispensed in grams at a pressure of 60 pounds per square inch gauge per unit time, e.g., one minute. The extrusion rate is thus expressed in grams per minute. An extrusion rate of about 25 grams to about 300 grams per minute is considered satisfactory in use. A rate below about 25 grams per minute renders the composition difficult of application, while above about 300 grams per minute the bead might slump excessively and will have a tendency to run. The data obtained are tabulated below in Tables I to V, inclusive.

Table I

| Component | Example | | | | |
|---|---|---|---|---|---|
| | I | II | III | IV | V |
| Kraton 1102, Grams | 80 | 66.6 | 50 | 44.4 | 100 |
| Piccoumaron 410, Grams | 20 | 33.4 | 50 | 56.6 | None |
| CaCO₃, Grams | 100 | 100 | 100 | 100 | 100 |
| Toluene, Grams | 80 | 80 | 80 | 80 | 80 |
| Test Results | | | | | |
| Extrusion Rate, Grams Per Minute | 28 | 119 | 192 | 258 | 8.0 |
| Compressive Shear Strength, Pounds | 554 | 728 | 663 | 577 | 190 |

Table II

| Component | Example | |
|---|---|---|
| | VI | VII |
| Kraton 1102, Grams | 66.6 | 66.6 |
| Piccoumaron 410, Grams | 33.4 | 33.4 |
| CaCO₃, Grams | 100 | 100 |
| Toluene, Grams | 80 | 80 |
| Fumed Silica (Cab-O-Sil), Grams | 1 | 2 |
| Test Results | | |
| Extrusion Rate, Grams Per Minute | 97 | 110 |
| Compressive Shear Strength, Pounds | 635 | 471 |

Table III

| Component | Example | |
|---|---|---|
| | VIII | IX |
| Kraton 1102, Grams | 66.6 | 50 |
| Piccoumaron 410 EH, Grams | 33.4 | 50 |
| CaCO₃, Grams | 100 | 100 |
| Toluene | 80 | 80 |
| Test Results | | |
| Extrusion Rate, Grams Per Minute | 67 | 160 |
| Compressive Shear Strength, Pounds | 523 | 391 |

Table IV

| Component | Example | |
|---|---|---|
| | X | XI |
| Kraton 1102, Grams | 66.6 | 50 |
| Piccovar 130, Grams | 33.4 | 50 |
| Calcium Carbonate, Grams | 100 | 100 |
| Toluene, Grams | 80 | 80 |
| Test Results | | |
| Extrusion Rate, Grams Per Minute | 114 | 356 |
| Compressive Shear Strength, Pounds | 454 | 382 |

Table V

| Component | Examples | | | | | |
|---|---|---|---|---|---|---|
| | XII | XIII | XIV | XV | XVI | XVII |
| Kraton 1102, Grams | 80 | 66.6 | 50 | 50 | 44.4 | 40 |
| Velsicol XL-30, Grams | 20 | 33.4 | 50 | 50 | 55.6 | 60 |
| CaCO₃, Grams | 100 | 100 | 100 | 100 | 100 | 100 |
| Toluene, Grams | 80 | 80 | 80 | 40 | 80 | 80 |
| Test Results | | | | | | |
| Extrusion Rate, Grams Per Minute | 56.8 | 138 | 250 | 22.3 | 540 | 945 |
| Compressive Shear Strength, Pounds | 475 | 493 | 687 | 212 | 300 | 200 |

Referring to the components used in the adhesive compositions above, Kraton 1102 is a styrene-butadiene block copolymer made and sold by Shell Chemicals wherein the terminal styrene block has a molecular weight of about 5,000 to about 125,000 and the center butadiene block has a molecular weight of about 15,000 to about 250,000, with the styrene block constituting about 28 per cent by weight of the total block. Piccoumaron 410, Piccoumaron 410 EH and Piccovar 130 are all coumarone-indene resins made and sold by Pennsylvania Industrial Chemicals having softening points of 100° C., 120° C. and 130° C., respectively. Velsicol XL-30 is a styrene-indene-isoprene terpolymer made and sold by Velsicol Chemical Company having a softening point of about 101° to about 105° C. Cab-O-Sil is a fumed silica made and sold by Cabot Corporation.

The data in the above tables illustrate the effectiveness of the improved adhesives of this invention. Note that satisfactory performances were obtained with each composition containing each of the necessary components and only when each component was present within the defined range. Thus, in Example V with no tackifier present the extrusion rate was too low and the compressive shear strength was unsatisfactory. In Example XV with solvent being present outside the defined range unsatisfactory performances were obtained both as to extrusion rate and compressive shear strength.

In another series of runs a formulation containing 66.6 grams of Kraton 1102, 33.4 grams of Piccoumaron 410, 100 grams of calcium carbonate having an average diameter of 5 × 10⁴ A., 0.5 grams of 1,3,5-trimethyl-2,4,6(3,5-ditertiarybutyl-4-hydroxybenzyl)-benzene, 80 grams of toluene and 1.0 grams of Cab-O-Sil was prepared in the manner described above. The formulation was then employed to bond treated plywoods to woods in accordance with the test procedures outlined in Performance Specifications AFC–01 prepared by American Plywood Association referred to above and subjected to the tests therein. The results obtained are set forth below in Table VI.

Table VI

| Test Number | Minimum Acceptable Performance Required By AFC-01, Compressive Shear Strength, Pounds | Performance Obtained Herein Following Test Procedure AFC-01 |
| --- | --- | --- |
| A — Wet Lumber | 225 | 713 |
| B — Frozen Lumber | 150 | 615 |
| C — Dry Lumber | 225 | 1112 |
| D — Gap Filling | 150 | 890 |
| E — Moisture Resistance | 225 | 655 |
| F — Oxidation Resistance | Should Pass | Passed |

The above clearly shows that the improved adhesive composition of this invention far surpasses the performance requirements required for industrial use in bonding wood to wood.

Obviously, many modifications and variations of the invention, as hereinabove set forth, can be made without departing from the spirit and scope thereof, and therefore only such limitations should be imposed as are indicated in the appended claims.

I claim:

1. An adhesive composition consisting essentially of a styrene-butadiene block copolymer, a tackifier, calcium carbonate and a solvent wherein the components thereof are present in the following ranges, assuming the presence of 100 parts by weight of the styrene-butadiene component in the final composition:

| Component | Weight Per Cent |
| --- | --- |
| [Styrene-Butadiene Block Copolymer] | [100] |
| Tackifier | 20–125 |
| Calcium Carbonate | 60–500 |
| Solvent | 85–1500 |

, with the styrene-butadiene block copolymer having the following general configuration:

A — B — A, wherein A is a styrene polymer block having an average molecular weight of about 5,000 to about 125,000 and B is a butadiene polymer block having an average molecular weight of about 15,000 to about 250,000, the calcium carbonate having an average diameter of about $0.2 \times 10^4$ A. to about $50 \times 10^4$ A., and the solvent being selected from the group consisting of aromatic hydrocarbons having from six to eight carbon atoms, aliphatic hydrocarbons having from six to eight carbon atoms and ketones having from two to four carbon atoms boiling between about 60° to about 145°C.

2. The composition of claim 1 wherein the components thereof are present in the following ranges, assuming the presence of 100 parts by weight of the styrene-butadiene component in the final composition:

| Component | Weight Per Cent |
| --- | --- |
| [Styrene-Butadiene Block Copolymer] | [100] |
| Tackifier | 35–100 |
| Calcium Carbonate | 75–400 |
| Solvent | 100–600 |

, with the styrene-butadiene block copolymer having the following general configuration:

A — B — A, wherein A is a styrene polymer block having an average molecular weight of about 15,000 to about 100,000 and B is a butadiene polymer block having an average molecular weight of about 25,000 to about 150,000, the calcium carbonate having an average diameter of about $2 \times 10^4$ A. to about $25 \times 10^4$ A., and the solvent being selected from the group consisting of aromatic hydrocarbons having from six to eight carbon atoms, aliphatic hydrocarbons having from six to eight carbon atoms and ketones having from two to four carbon atoms boiling between about 100° to about 120°C.

3. The composition of claim 1 wherein the total of the terminal blocks A amount to about 20 to about 80 weight per cent of the block copolymer.

4. The composition of claim 1 wherein the total of the terminal blocks A amount to about 23 to about 50 weight per cent of the block copolymer.

5. The composition of claim 1 wherein the tackifier is a resin based on coumarone or indene.

6. The composition of claim 1 wherein the tackifier is a coumarone-indene resin.

7. The composition of claim 1 wherein the solvent is toluene.

* * * * *